Figure 3:
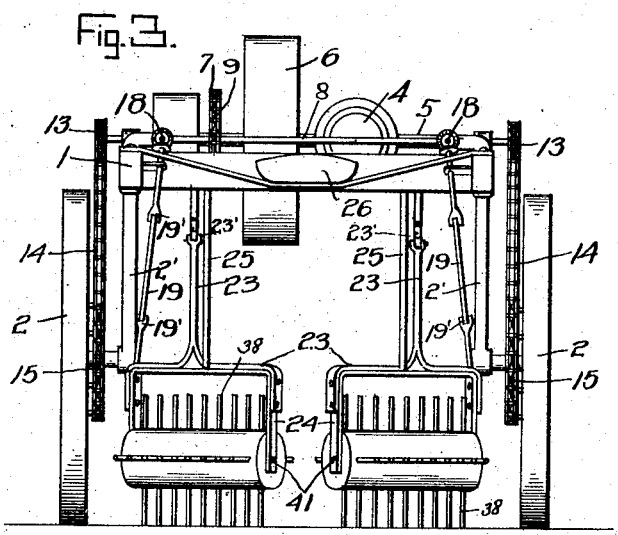

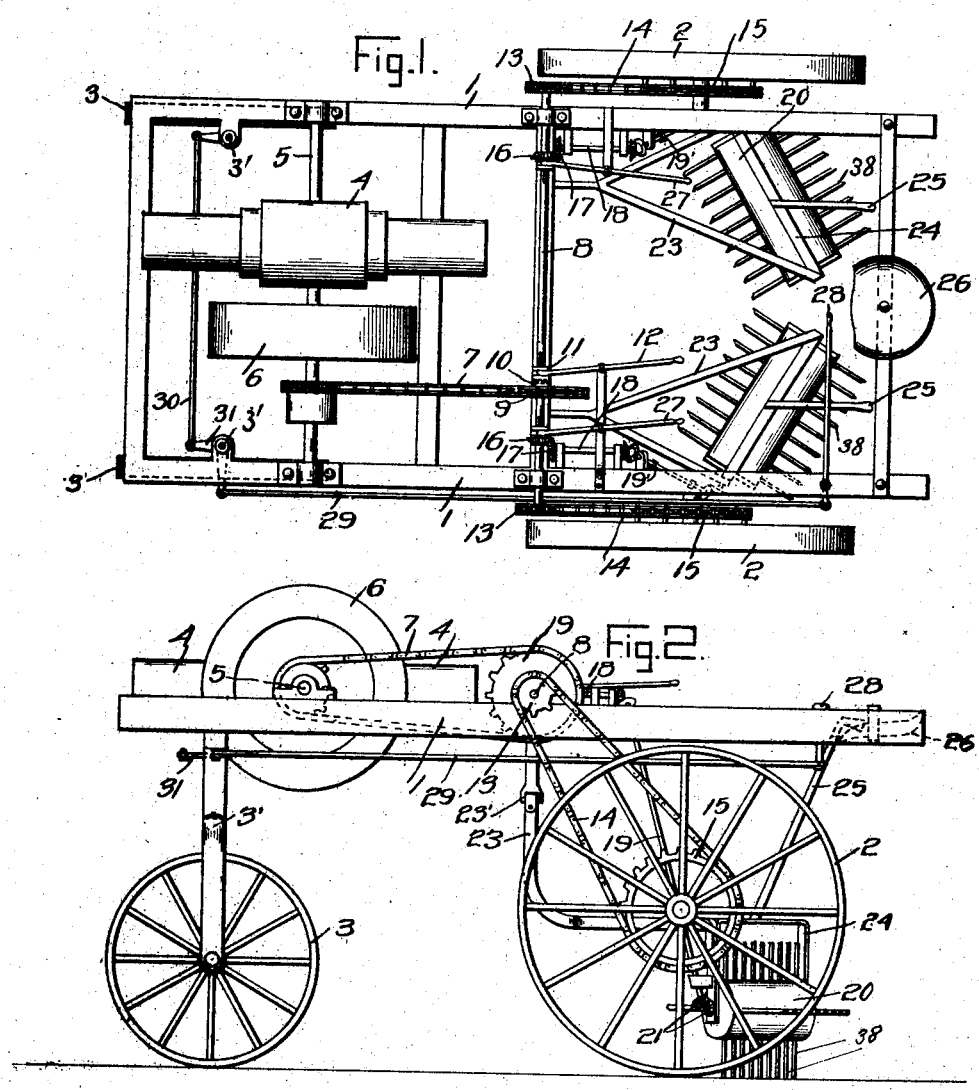

A. R. LYNCH.
AUTOMOBILE CULTIVATOR.
APPLICATION FILED SEPT. 17, 1909.

973,677.

Patented Oct. 25, 1910.
2 SHEETS—SHEET 2.

UNITED STATES PATENT OFFICE

ADOLPHUS R. LYNCH, OF DANVILLE, ILLINOIS.

AUTOMOBILE CULTIVATOR.

973,677.     Specification of Letters Patent.     Patented Oct. 25, 1910.

Application filed September 17, 1909. Serial No. 518,225.

*To all whom it may concern:*

Be it known that I, ADOLPHUS R. LYNCH, a citizen of the United States, and resident of Danville, in the county of Vermilion and State of Illinois, have invented certain new and useful Improvements in Automobile Cultivators, of which the following is a specification.

The present invention relates to cultivating machines, and particularly those of the vertical rotating type and has for its purpose to provide a machine of that character adapted to be propelled through the medium of an explosive engine whereby to entirely eliminate the use of horse power therefor.

A further purpose of the invention is to provide a machine of the type in question, whereby the rotary cultivators are at all times under the immediate control of the operator to the extent that their rotary movement may be controlled at will and whose direction of travel may be varied from their true course to avoid interference with the plants.

With the above objects in view, the invention is described in full detail in the following specification and the novel points thereof set forth in the appended claims.

In the accompanying drawings, which show the invention in its preferred structure, Figure 1 is a top plan view thereof, Fig. 2 is a side elevation of the same, and Fig. 3 is a rear end elevation.

Referring now to the several figures more in detail and with like numerals of reference indicating corresponding parts in the different figures shown, the invention comprises a vehicle whose frame is designated by 1, and 2 and 3 are the rearward and forward wheels thereof respectively. Said frame is suitably supported above the wheels by the uprights 2' and the pair of forks 3', whereby the vehicle may easily clear the plants to be cultivated.

Suitably mounted upon the frame 1 is an engine 4 preferably of the internal combustion type and 5 is the shaft driven thereby and 6 the fly wheel. A chain 7 transmits power from the main shaft 5 to a countershaft 8 through the medium of a sprocket 9 that is mounted free to rotate thereon. Said sprocket 9 is provided with a clutch element 10 with which coöperates a like member 11 that is splined upon the shaft 8 and provided with a lever 12 for moving the same into and out of engagement with the member 10. At its opposite ends the shaft 8 is fitted with sprockets 13 upon which travel a pair of chains 14 that transmit power to the wheels 2 through the medium of sprockets 15 that are mounted on said wheels. The shaft 8 is also provided with a pair of beveled pinions 16 disposed intermediate the end pinions 13, and which are splined on said shaft. The pinions 16 are adapted to mesh with a pair of like pinions 17 that are mounted upon counter-shafts 18. Said shafts 18 are normally held in gearing relation with and are adapted to drive counter-shafts 19, which in turn cause the rotation of the cultivators 20 through the gearing connections 21 as clearly shown in Fig. 2. Said cultivators 20 are adapted to rotate counter-wise to the direction of travel of the vehicle, and by so doing to throw the pulverized earth inwardly toward the row of plants over which the vehicle is traveling. To effect this latter condition, the cultivators 20 are inclined rearwardly and toward each other and are provided with a plurality of radially disposed teeth 38 and constitute the cultivators proper of the machine.

The means for mounting the cultivators comprise two Y-frames 23, the two rear members of which are provided with a reach or section 24 within which are journaled the cultivators 20 as shown in Figs. 2 and 3. The upright portions 23 or those parts of the frames that connect with the vehicle frame proper are constructed with a double hinge 23' (see Figs. 2 and 3), whereby the cultivators may be changed or moved from their true path for the purpose of avoiding obstacles, or plants that should happen to be to either side of the row that is being cultivated. For the purpose of effecting this deflection of the cultivators, the frames thereof are each fitted with a handle 25 that is conveniently within reach of the operator who sits in the seat 26. The shafts 19 are preferably provided with knuckle joints 19' to give them freedom of movement.

In order that the rotation of the cultivators may be controlled at will by the operator, there is provided a pair of handles or levers 27 which serve to connect or disconnect the beveled gearings 16 and 17 in a manner that will be obvious. A lever 28 disposed immediately in front of the seat 26 controls, through the rods 29, 30 and the bell cranks 31, the direction of the wheels 3 whereby to steer the machine.

From the foregoing it will be seen that this machine will effectively cultivate the ground to either side of the plant row and that such earth as has been removed intermediate the rows will be thrown in a more or less pulverized state toward the plants, the advantages of which will be obvious.

Having thus described my invention, what I claim as new therein and desire to secure by Letters Patent is:—

1. A machine for cultivating the soil comprising a vehicle, a rotary and obliquely disposed cylinder carried thereby and provided with a plurality of radially disposed teeth; the mounting of said cylinder permitting of slight lateral displacement thereof, and means for imparting rotary movement to said cylinder.

2. A machine for cultivating the soil comprising a vehicle, a pair of cylinders carrying a plurality of teeth and mounted to rotate in said vehicle, said cylinders adapted to have slight lateral movement and being oppositely disposed toward the rear of the vehicle, and means for imparting rotary movement to said cylinders opposite the direction of travel of the vehicle.

3. A machine for cultivating the soil comprising a vehicle, a motor for propelling the vehicle, a pair of opposite and rearwardly disposed cultivators mounted in said vehicle and adapted to be rotated opposite the direction of travel thereof, said cultivators comprising a plurality of radially disposed teeth carried by cylinders, means for permitting of separate or simultaneous rotation of the cylinders, and means for effecting lateral displacement of the cylinders whereby to move the pulverizing teeth clear of obstacles in the path thereof.

4. A machine for cultivating the soil comprising a vehicle, a motor for propelling the vehicle, a pair of arms with double joints secured to the frame of the vehicle and provided with levers whereby the same may be moved laterally, a cylinder rotatably mounted in each of said arms and provided with a plurality of radially disposed teeth, and gearing connections having knuckle joints adapted to transmit movement to said cylinders through the operation of said motor.

The foregoing specification signed at Danville, Illinois this seventh day of September, 1909.

ADOLPHUS R. LYNCH.

In presence of two witnesses:
 JAMES A. MEEKS,
 GRACE D. AUER.